No. 828,750. PATENTED AUG. 14, 1906.
J. W. KLOPP.
CULTIVATOR.
APPLICATION FILED DEC. 26, 1905.
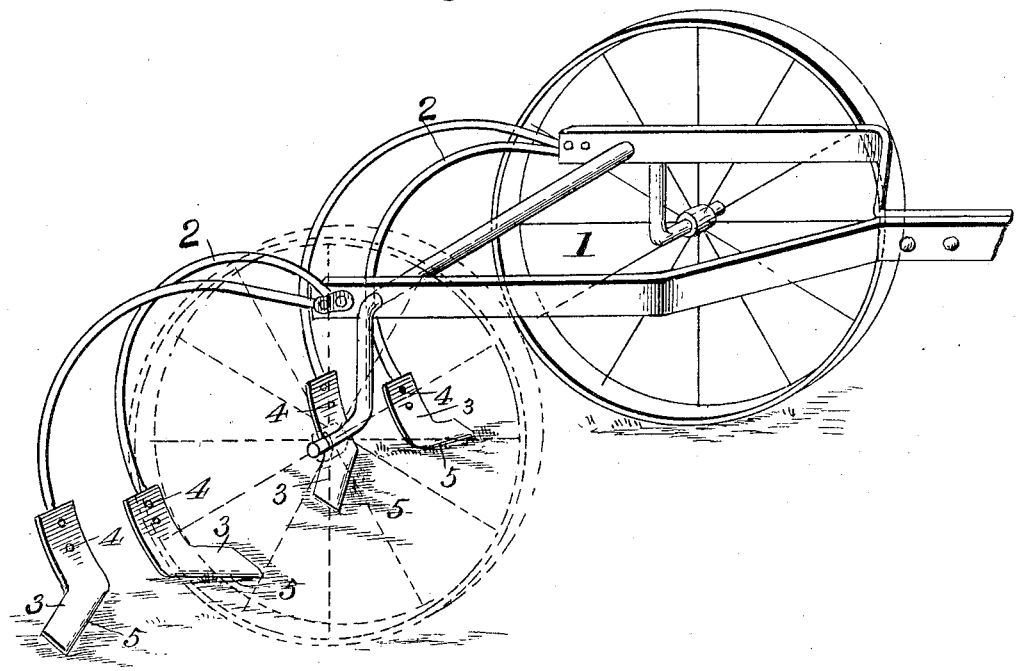
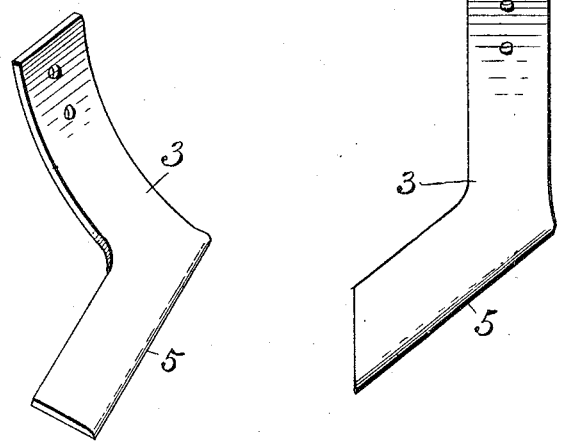
Witnesses
F. L. Ourand
L. E. Barkley
Inventor
James W. Klopp
By Frank S. Appleman
Attorney

UNITED STATES PATENT OFFICE.

JAMES W. KLOPP, OF BUCKEYE, IOWA.

CULTIVATOR.

No. 828,750.  Specification of Letters Patent.  Patented Aug. 14, 1906.

Application filed December 26, 1905. Serial No. 293,297.

*To all whom it may concern:*

Be it known that I, JAMES W. KLOPP, a citizen of the United States of America, residing at Buckeye, in the county of Hardin and State of Iowa, have invented certain new and useful Improvements in Cultivators, of which the following is a specification.

This invention relates to cultivators, and more particularly to that class known as "parallel" cultivators.

An object of this invention is to produce novel shovels which coact to break the soil between the rows of corn or other vegetables, the said blades being so arranged as to have a drawing action when in contact with the soil.

A further object of this invention is to provide a device designed to accomplish the result noted, the blades of which are readily applied and removed, and, furthermore, it is an object of the invention to have the blades of each gang oppositely disposed with the ends slightly overreaching the line in order that the entire space between the rows may be acted upon.

With the foregoing and other objects in view the invention consists in the details of construction and in the arrangement and combination of parts to be hereinafter more fully set forth and claimed.

In describing the invention in detail reference will be had to the accompanying drawings, forming part of this specification, wherein like characters denote corresponding parts in the several views, in which—

Figure 1 is a view in perspective, showing the invention applied to a cultivator. Figs. 2 and 3 are detail views of the device.

In the drawings, 1 indicates a sulky, which may be of any desired construction, and 2 indicates beams pivotally connected to the sulky in order that the said beams may be moved transversely of the sulky to bring them into proper relation to the rows of corn. The beams have downwardly-curved rear ends and terminate one back of the other in each series, so that the shovel or cutting members (to be hereinafter described) will appear in staggered relation transversely and longitudinally of the sulky.

The shovels 3 are approximately L-shaped, though the stem is curved to conform to the curvature of the depending portions of the arms, and the said shovels are bolted or otherwise detachably secured to the beams by means of the bolts 4. As the means for attaching the shovels forms no part of the invention, I do not wish to be limited in this respect. The foot of the shovel is inclined downwardly with relation to the stem. This is done so that the shovel can perform two functions, that of a cultivator and that of a weed-cutter, the lower portion of the foot performing the function of the cultivator, while the upper portion performs the function of the cutter or trimmer. The free portion of the foot is straight, while the remaining portion is gradually curved to merge into the curvature of the stem. The cutting edge—viz., the edge of the base of the shovel—is beveled, as shown at 5, and when inoperative a draw action is afforded which minimizes the amount of power required and serves as a means for more effectually breaking up the soil with which the knives come in contact. It is my purpose to arrange two shovels on each side with the ends of the bases extending toward each other.

Having fully described my invention, what I claim as new, and desire to secure by Letters Patent, is—

As a new article of manufacture, a cultivator-shovel comprising a curved stem having a foot at one end, said foot having its free portion straight while the remaining portion of the foot is gradually curved to merge into the curvature of the stem.

In testimony whereof I affix my signature, in the presence of two witnesses, this 27th day of November, 1905.

JAMES W. KLOPP.

Witnesses:
H. J. BRUHNS,
M. S. BEACH.